(12) United States Patent
Linden et al.

(10) Patent No.: US 6,422,123 B1
(45) Date of Patent: Jul. 23, 2002

(54) ELECTRONICALLY CONTROLLABLE BRAKE BOOSTER (75) Inventors: Christoph Linden, Vallendar; Gregor Godlewsky, Bendorf, both of (DE)

(73) Assignee: Lucas Industries plc (GB)

( * ) Notice: Subject to any disclaimer, the term of this patent is extended or adjusted under 35 U.S.C. 154(b) by 0 days.

(21) Appl. No.: 09/540,274

(22) Filed: Mar. 31, 2000

Related U.S. Application Data (63) Continuation of application No. PCT/EP98/06224, filed on Sep. 30, 1998.

(51) Int. Cl.$^7$ ............................................... F15B 13/16
(52) U.S. Cl. ............................................................ 91/367
(58) Field of Search ............................... 91/367, 376 R (56) References Cited

U.S. PATENT DOCUMENTS

| | | | |
|---|---|---|---|
| 4,759,255 A | * 7/1988 | Shimamura | 91/376 R |
| 5,067,525 A | 11/1991 | Pickenhahn | |
| 5,172,964 A | * 12/1992 | Levrai et al. | 91/376 R |
| 5,357,846 A | * 10/1994 | Rudolph et al. | 91/376 R |
| 5,647,462 A | * 7/1997 | Tsubouchi et al. | 91/376 R |
| 5,711,204 A | 1/1998 | Michels | |
| 5,725,291 A | 3/1998 | Michels | |
| 5,816,667 A | 10/1998 | Jokic | |
| 5,937,727 A | * 8/1999 | Klesen et al. | 91/376 R |
| 5,969,443 A | 10/1999 | Linden et al. | |
| 6,164,183 A | * 12/2000 | Fulks et al. | 91/367 |
| 6,227,099 B1 | * 5/2001 | Kahrs et al. | 91/376 R |

FOREIGN PATENT DOCUMENTS

| | | |
|---|---|---|
| DE | 44 30 461 A1 | 2/1996 |
| DE | 195 27 493 A1 | 1/1997 |
| DE | 196 12 952 A1 | 10/1997 |
| EP | 0 435 112 A2 | 12/1990 |
| EP | 0 706 924 A1 | 9/1995 |

* cited by examiner

*Primary Examiner*—F. Daniel Lopez
*Assistant Examiner*—Igor Kershteyn
(74) *Attorney, Agent, or Firm*—MacMillan, Sobanski & Todd, LLC (57) ABSTRACT

In an electronically controllable brake booster a value is sensed which is characteristic for the actual pressure characteristic in the pressure chamber. The actual pressure characteristic is checked for the existence of periodic oscillation components of a predetermined frequency band with a predetermined minimum amplitude. Upon the existence of such periodic oscillation components, the current flowing through an electromagnetic actuator for a control valve arrangement of the brake booster is decreased by a first predetermined value for a first pressure changing position. Further, the current for a second pressure changing position is decreased by second predetermined value.

27 Claims, 10 Drawing Sheets

ELECTRONICALLY CONTROLLABLE BRAKE BOOSTER

CROSS REFERENCE TO RELATED APPLICATIONS

This application is a continuation of International Application No. PCT/EP98/06224 filed Sep. 30, 1998, which claims priority to German Patent Application No. 19744111.4 filed Oct. 6, 1997.

BACKGROUND OF THE INVENTION

The present invention relates to an electronically controllable brake booster. In particular, the present invention relates to an electronically controllable brake booster with a vacuum chamber and a pressure chamber, which are separated from each other by a movable wall, a control valve arrangement which can be actuated by means of an electromagnetic actuation means, and by means of which a pressure difference between the pressure chamber and the vacuum chamber can be adjusted, with the control valve arrangement, as a function of a current flowing through the electromagnetic actuation means, assuming a holding position in which the current ranges between a higher value and a lower value without the control valve arrangement leaving its holding position, a first pressure changing position in which the current is higher than the higher value, and a second pressure changing position in which the current is lower than the low value.

From DE 195 27 493 A1 an electromagnetic actuation means is known which comprises a solenoid coil which can be subjected to a control current and an armature which is associated with the solenoid coil and which is adapted to perform movements which are a function of a control current flowing through the solenoid coil and a spring arrangement which biases the armature in the opposite direction.

A holding position is defined as a manipulated variable, which the armature assumes at a holding current through the solenoid coil. This holding current flowing through the solenoid coil can be changed to a higher value or to a lower value without the armature leaving the holding position.

In addition, both the higher and the lower current value are dimensioned in such a manner that interfering influences on the magnetic and spring forces actuating the armature do not bring the armature into an actuated position which differs from the holding position.

For this purpose, the higher current value is determined in such a manner that a value which is related to the position of the armature in the holding position is determined, the control current is increased by a predetermined current step in a stepwise manner, and the control current is output to the solenoid coil of the electromagnetic actuation means as a manipulated variable, until the value which is related to the position of the armature in the holding position changes by a predetermined value towards the second actuated position.

The lower current value is determined in such a manner that a value which is related to the position of the armature in the holding position is determined, the control current is decreased by a predetermined current step in a stepwise manner, and the control current is output to the solenoid coil of the electromagnetic actuation means as a manipulated variable, until the value which is related to the position of the armature in the holding position changes by a predetermined value towards the first actuated position.

From this document is it also known that the control valve arrangement can reliably be brought into the holding position if the arithmetic mean value of the currents is selected for the holding current.

However, the learning of the working points discussed in DE 195 427 93 A1limited in that the decisive currents for the lower limit and the upper limit must be learned and stored at each commencement of a trip upon switching on the ignition or in periodic time intervals during driving. Upon controlling the control valve arrangement, the currents which have been learned in this manner are used for specifying the first manipulated variable in order to achieve an adequate control behaviour.

However, the pressure difference acting upon the movable wall of the brake booster, which can be adjusted to different values depending upon the desired control, is not considered quantitatively. The pressure difference adjusted at the movable wall is also acting immediately upon the valve body, the valve seat, and the valve element, which also leads to a shift of the currents for the lower limit and for the upper limit.

SUMMARY OF THE INVENTION

Thus, the invention deals with the problem which results from the shift of the upper and lower current values that are necessary in order to retain the control valve arrangement in its holding position.

It is therefore the object of the present invention to eliminate this disadvantage so that the control behaviour is further improved in order to compensate interfering influences during operation for a further improvement of the efficiency of the electronically controllable brake booster.

This object is solved with the initially mentioned electronically controllable brake booster in that a value is sensed which is characteristic for the actual pressure characteristic in the pressure chamber, the actual pressure characteristic is checked for the existence of periodic oscillation components of a predetermined frequency band with a predetermined minimum amplitude, and that upon the existence of such periodic oscillation components of the predetermined frequency band, the current for the first pressure changing position is decreased by a first predetermined value, and the current for the second pressure changing position is increased by a second predetermined value.

The inventive method thereby make use of the surprising fact that in an electronically controllable brake booster with incorrectly set working points of the currents for the first and the second pressure changing position, an oscillation frequency occurs which is typical for the respective brake booster, which is superimposed on the signal representing the brake pressure generated in the brake cylinder. It is understood that the predetermined minimum amplitude can be in the near vicinity of zero. However, the interference immunity can be set via this parameter.

This oscillation is detected and, depending on its existence, the values of the currents for the first and the second pressure changing position are changed.

In a preferred embodiment of the invention the decrease of the current for the first pressure changing position is made by the first predetermined value, and the increase of the current for the second pressure changing position is made by a second predetermined value for only a predetermined time period.

After a predetermined time interval following the decrease or increase, respectively, of the current for the first or second, respectively, pressure changing position, the actual pressure characteristic is checked for the existence of the periodic oscillation components of the predetermined frequency band with the predetermined minimum amplitude, and upon the existence of such periodic oscillation components of the predetermined frequency band, the first predetermined value for the decrease of the current for the first pressure changing position and the second predetermined value for the increase of the current for the second pressure changing position are both increased. This is to counteract the vibration tendency of the brake booster.

The check of the actual pressure characteristic for the existence of the periodic oscillation components of the predetermined frequency band with the predetermined minimum amplitude is preferably made by determining the time intervals between characteristic places of the actual pressure characteristic.

Thereby, the characteristic places of the actual pressure characteristic can be one of the maxima, minima, zero crossings, and curve sections with comparable gradients.

In order to be able to find and to evaluate comparable characteristic places of the actual pressure characteristic better, it may be useful to filter out direct components of the signal representing the actual pressure characteristic.

In lieu of the analysis of the actual pressure characteristic in the time range, it is also possible to carry out an analysis in the frequency range (Fourier analysis, etc.).

Primarily, the available computer power or the hardware expenditure to be invested relative to the required or desired accuracy is the decisive factor in which manner the existence of the periodic oscillation components of the predetermined frequency band in the actual pressure characteristic is determined.

In a preferred embodiment of the invention the first pressure changing position is a pressure build-up position (of the control valve arrangement), and the second pressure changing position is a pressure relief position (of the control valve arrangement).

According to the invention, the predetermined frequency band ranges from 0 Hz to 25 Hz, preferably from 5 Hz to 10 Hz, and particularly preferably, ranges about 7 Hz. Primarily, the predetermined frequency band depends on the construction or type, respectively, of the brake booster (moved masses, volumes of chambers, etc.).

Further properties, advantages, characteristics, and variation possibilities of the invention will be explained by means of the following description of a current preferred embodiment of the invention with reference to the drawings.

DETAILED DESCRIPTION OF THE INVENTION

Figure 1:
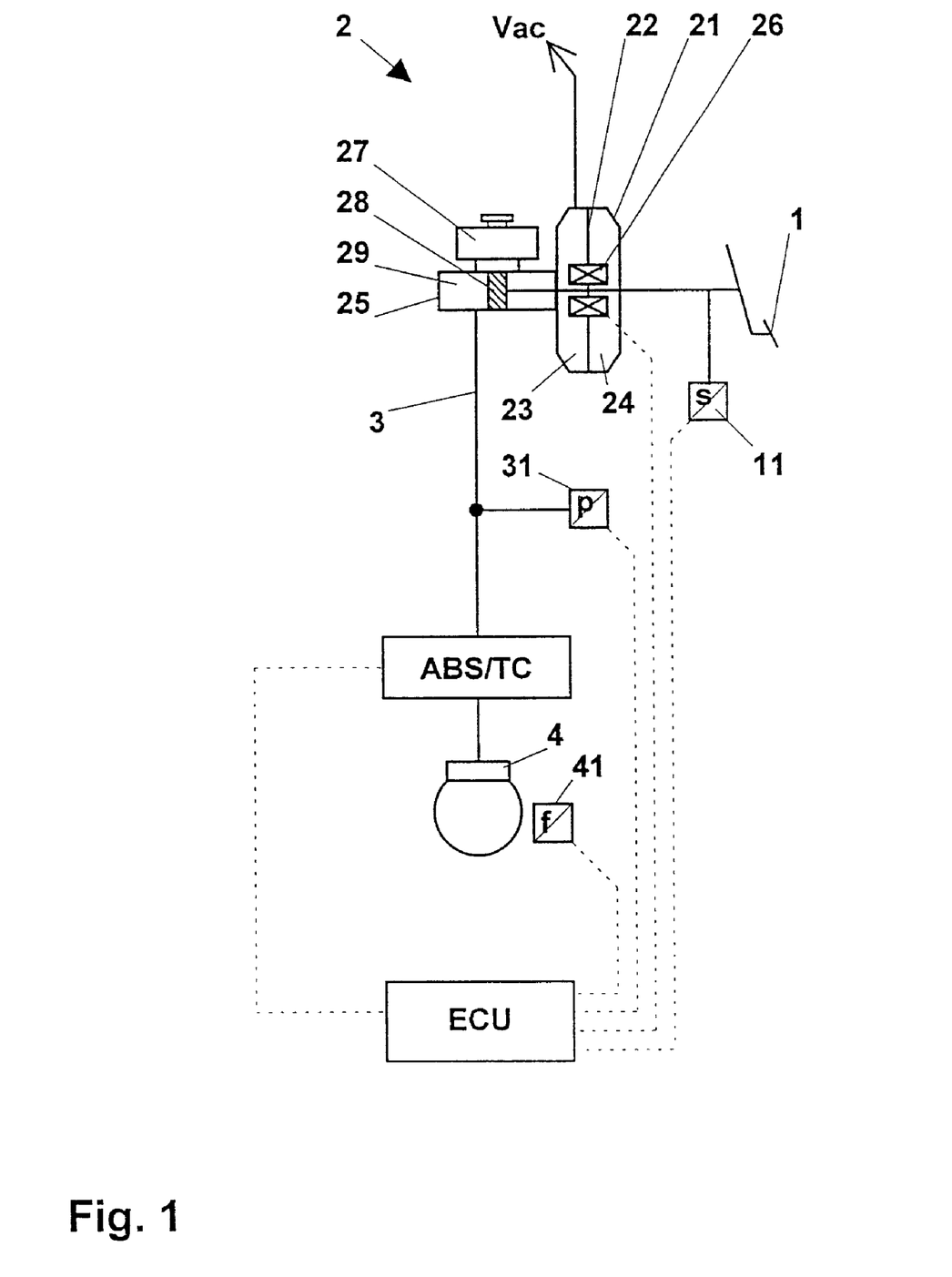
FIG. 1 schematically shows a vehicle brake system with an electronically controllable brake booster.

In the vehicle brake system which is schematically shown in FIG. 1, a brake pedal 1 is used to actuate a brake pressure generator unit 2 via an actuating element. The brake pressure generator unit 2 comprises a brake cylinder 25 in which a piston 28 forms a pressure chamber 29. The pressure chamber 29 is supplied with brake fluid from a reservoir 27. A brake line 3 leads from the pressure chamber 29 to a wheel brake 4 of the vehicle.

An anti-blocking control means and/or a traction control means ABS/TC are arranged in the brake line 3 between the brake pressure generator unit 2 and the wheel brake 4. The anti-blocking and/or traction control means ABS/TC comprises i.a. valve and pump arrangements in a known manner which can be driven by an electronic control unit ECU in order to modulate the pressure in the wheel brake. This occurs as a function of the rotational behaviour of a vehicle wheel associated with the wheel brake 4, which is sensed by means of a sensor 41 and supplied to the electronic control unit ECU.

The brake pressure generator unit 2 comprises a brake booster 21 for the amplification of the actuation force which is introduced by the driver via the brake pedal 1. A movable wall 22 divides the brake booster 21 into a vacuum chamber 23 and a pressure chamber 24. For the generation of the vacuum, the vacuum chamber 23 is connected to a vacuum source Vac which is not shown in detail. In a vehicle which is equipped with an Otto engine, the vacuum which is inherently produced in the intake tube, is available. However, in a vehicle which is equipped with a Diesel engine or an electric motor, an additional vacuum pump is required as the vacuum source Vac. Upon an actuation of the brake pedal 1, the brake booster functions in a known manner in that the pressure chamber 24 is subjected to atmospheric pressure so that a pressure difference is acting on the movable wall 22, which assists the actuation force introduced at the brake pedal 1. In the non-actuated condition the vacuum chamber 23 and the pressure chamber 24 are connected with each other and thus pressure compensated so that no pressure difference is effective at the movable wall 22.

Figure 3:
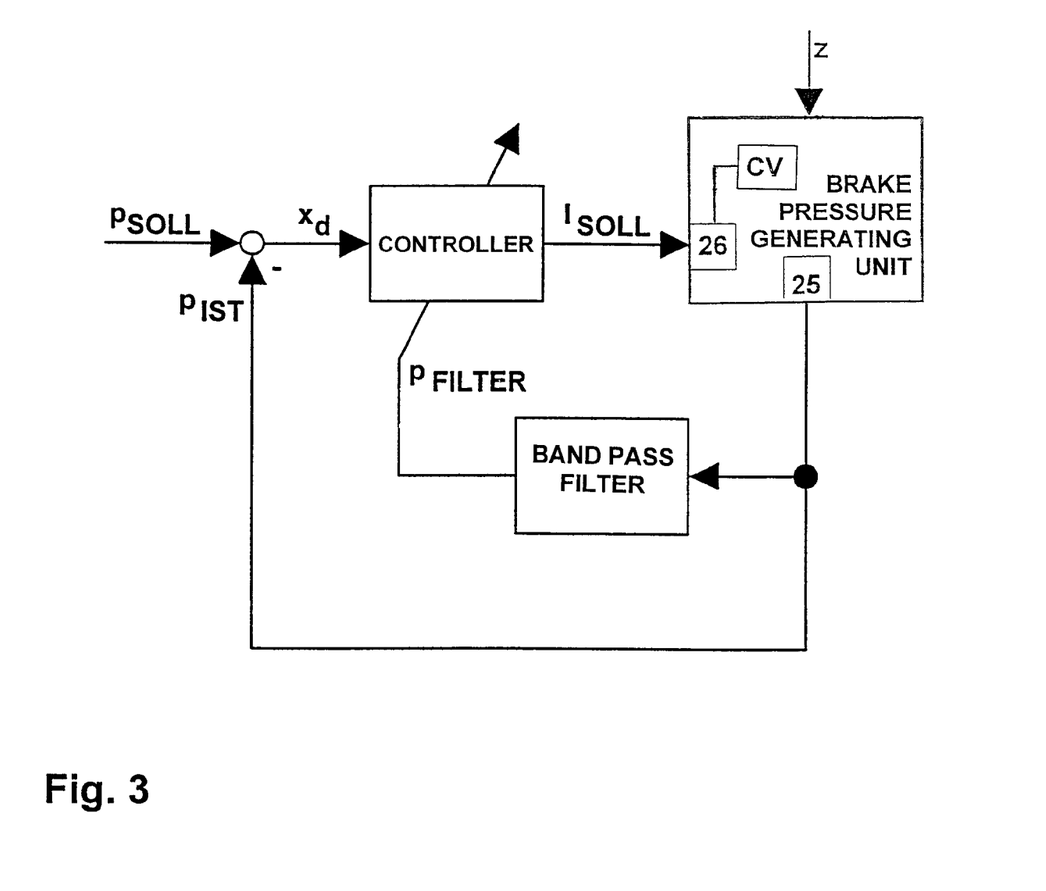
FIG. 3 schematically shows a control loop in which a brake booster is operated in the inventive manner.
Figure 6:
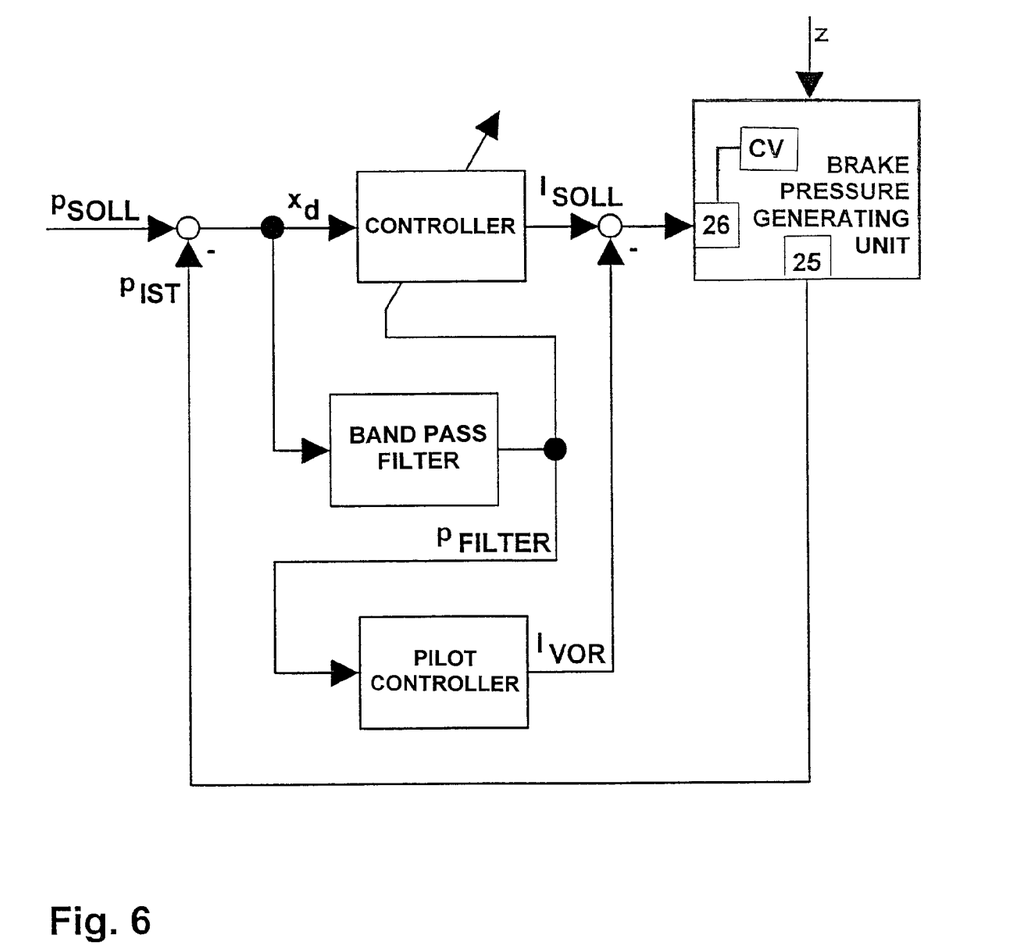
FIG. 6 shows another embodiment of a control loop in which a brake booster is operated in the inventive manner.

For this purpose, the solenoid arrangement 26 actuates a control valve CV which is not shown in detail herein but in FIGS. 3 and 6, in order to bring the brake booster 21 into different control positions (I,. II., III.):

into a first so-called "build-up" position (I.) in which the connection of the vacuum chamber 23 with the pressure chamber 24 is blocked, and the connection of the pressure chamber 24 with atmosphere is open so that a pressure difference at the movable wall 22 is built up or increased, respectively, or into a second so-called "holding position" (II.) in which the connection of the vacuum chamber 23 with the pressure chamber 24 and the connection of the pressure chamber 24 with atmosphere are blocked so that a pressure difference acting on the movable wall is maintained, into a third so-called "relief position" (III.) in which the connection of the vacuum chamber 23 with the pressure chamber 24 is open, and the connection of the pressure chamber 24 with atmosphere is blocked so that a pressure difference acting on the movable wall 22 is relieved via a pressure compensation process.

In order to bring the control valve into the different control positions (I., II., III.) the electronic control unit ECU subjects the solenoid arrangement 26 to a control current $I_{SOLL}$, with the variation of the control current $I_{SOLL}$ being effected, for example, by means of pulse width modulation. A magnetic force is acting on the armature of the armature of the solenoid arrangement 26, which causes a positioning of the armature, from which, in turn, the control positions (I., II., III.) result.

The brake pressure $P_{IST}$ which is generated in the pressure chamber 29 of the brake cylinder 25 and introduced into the brake line 3 is sensed by means of a sensor 31 and transmitted to the electronic control unit ECU in order to control the brake pressure $P_{IST}$ as a function of the desired pressure value and/or the pressure characteristic $P_{SOLL}$ by adjusting the solenoid current $I_{SOLL}$ which controls the solenoid arrangement 26.

Figure 2:
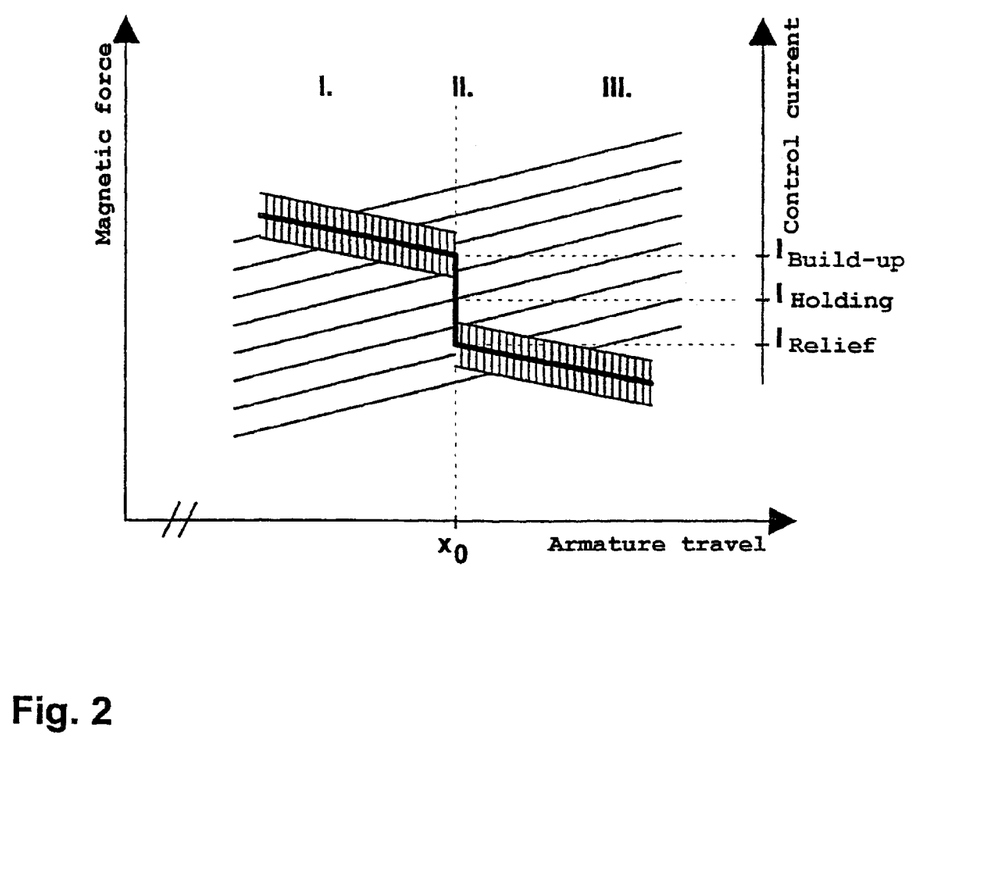
FIG. 2 shows a schematic diagram for explaining the control characteristic of an electronically controllable brake booster.

In the diagram according to FIG. 2, the armature travel is plotted over the abscissa, and the magnetic force which acts on the armature and which results as a function of the control current $I_{SOLL}$ is plotted over the ordinate. This is a schematic representation which relates to a working range which is designed in such a manner that a proportional relationship exists between magnetic force and control current. In addition, the control characteristic of the electronically controllable brake booster is entered. This control characteristic comprises a total of three branches. For the vertical branch, a current range $I_{ABBAU} < I_{SOLL} < I_{AUFBAU}$ is associated with a certain armature position $x_0$, with the position $x_0$ exactly corresponding to the "holding position" (II.). The inclined branch which from the vertical branch extends towards the left applies to a current $I_{SOLL} > I_{AUFBAU}$ and represents the "build-up" position (I.), while the branch extending to the right of the vertical branch applies to a current $I_{SOLL} < I_{ABBAU}$ and characterises the "relief position".

Due to interfering influences which are caused, for example, by friction losses, tolerances, temperature variations, or variations of external reaction forces which, in particular, include variations of the pressure force component in the vacuum chamber 23 of the brake booster 21, the control characteristic in the area of the inclined branches has a scatter band, which leads to a shift of the working points $I_{ABBAU}$ and $I_{AUFBAU}$. In order to counteract this problem with respect to the "holding position" (II.), a current is preferably adjusted for $I_{HALT}$, which results as the arithmetic mean value of the currents $I_{AUFBAU}$ and $I_{ABBAU}$. This and in particular a method for learning the currents $I_{ABBAU}$ and $I_{AUFBAU}$ which are decisive for the working point is described in DE 195 27 493 A1.

However, the method discussed in DE 195 27 493 A1 is limited to learning the currents $I_{ABBAU}$ and $I_{AUFBAU}$ with each commencement of a trip when switching on the ignition or in periodic time intervals during driving, however, with no control request for the operation of the electronically controllable brake booster.

Compared to this, the inventive method is based on the surprising finding that in an electronically controllable brake booster with incorrectly set working points $I_{ABBAU}$ and $I_{AUEAU}$ a typical oscillation frequency $f_{TYP}$ occurs which lies in the order of 7 Hz and is superimposed on the signal $P_{IST}$ representing the brake pressure generated in the brake cylinder 25.

Usually, the operation of the electronically controllable brake booster 21 takes place in a closed control loop as shown in FIG. 3. A controlled variable—the brake pressure PIST generated in the brake cylinder 25—which originates from the controlled system—the brake pressure generator unit 2—is continuously sensed and compared with a reference variable—the desired pressure characteristic $P_{SOLL}$.

The result of this comparison is a standard deviation $x_d$ which is supplied to a controlling means R. The manipulated variable which originates from the controlling means R is the control current $I_{SOLL}$ which is supplied to the solenoid arrangement 26 for actuating the control valve. The interfering variables z which act upon the brake pressure generator unit 2 from outside are mainly the already mentioned influences caused by friction, tolerances, and reaction forces.

For the detection of the typical oscillation frequency $f_{TYP}$ a bandpass filter F is provided which has a center frequency in the order of the typical oscillation frequency $f_{TYP}$. The input side of the bandpass filter F is supplied with the signal $P_{IST}$. Due to bandpass filtering, a periodic (sinusoidal) signal $P_{FILTER}$ results at the output side which, contrary to the signal $P_{IST}$, does not comprise direct components and therefore, if provided, represents exactly the typical oscillation. If no typical oscillation occurs, i.e. if the working points $I_{ABBAU}$ and $I_{AUFBAU}$ are correctly adjusted, the signal $P_{FILTER}$ equals (almost) zero. The signal $P_{FILTER}$ is supplied to the controlling means R in order to adjust the control current $I_{SOLL}$ to the correct working points $I_{ABBAU}$ and $I_{AUFBAU}$.

For the adjustment of the control current $I_{SOLL}$ to the correct working points $I_{ABBAU}$ and $I_{AUFBAU}$ an oscillation detection is first carried out which will be described in the following with reference to the flow diagram shown in FIGS. 4a to 4c.

Figure 4A:
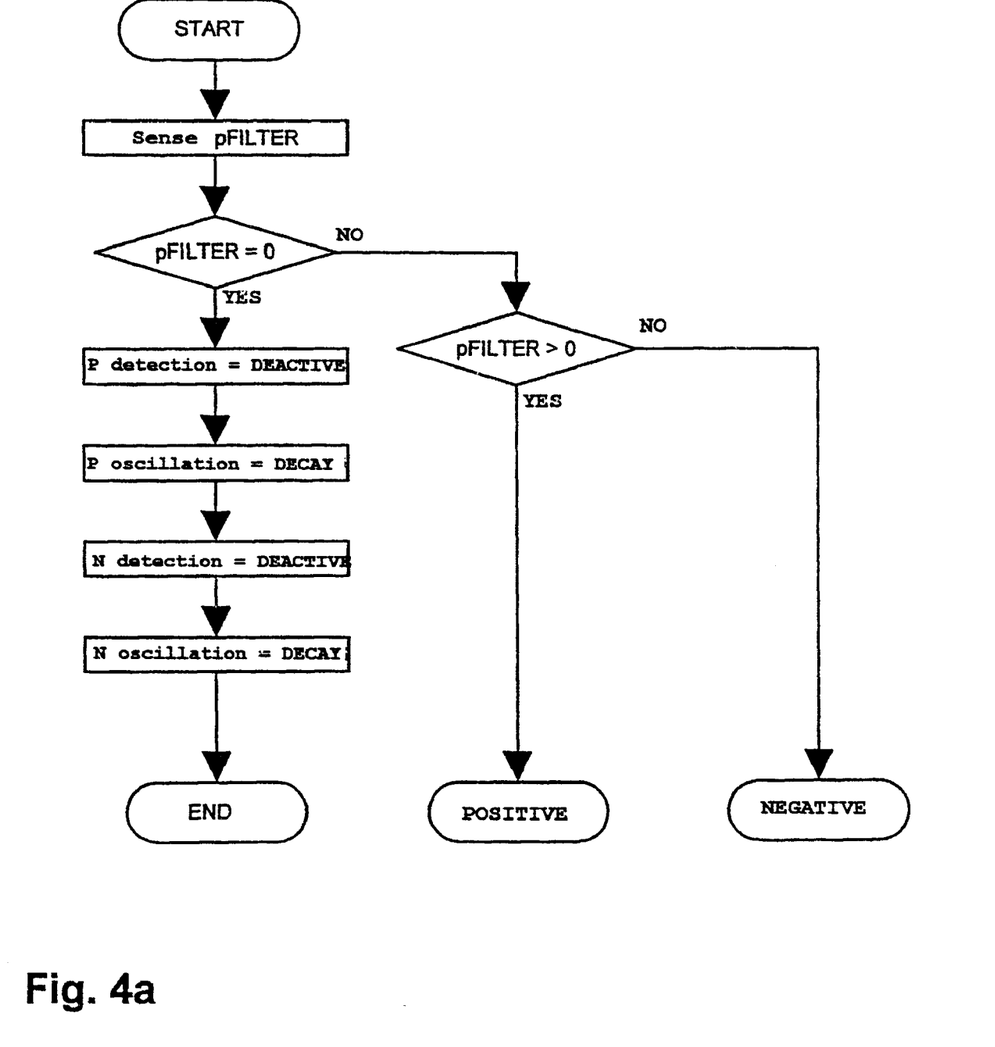
FIGS. 4a to 4c schematically show a flow diagram for detecting the typical oscillation frequency of an electronically controllable brake booster.
Figure 4B:
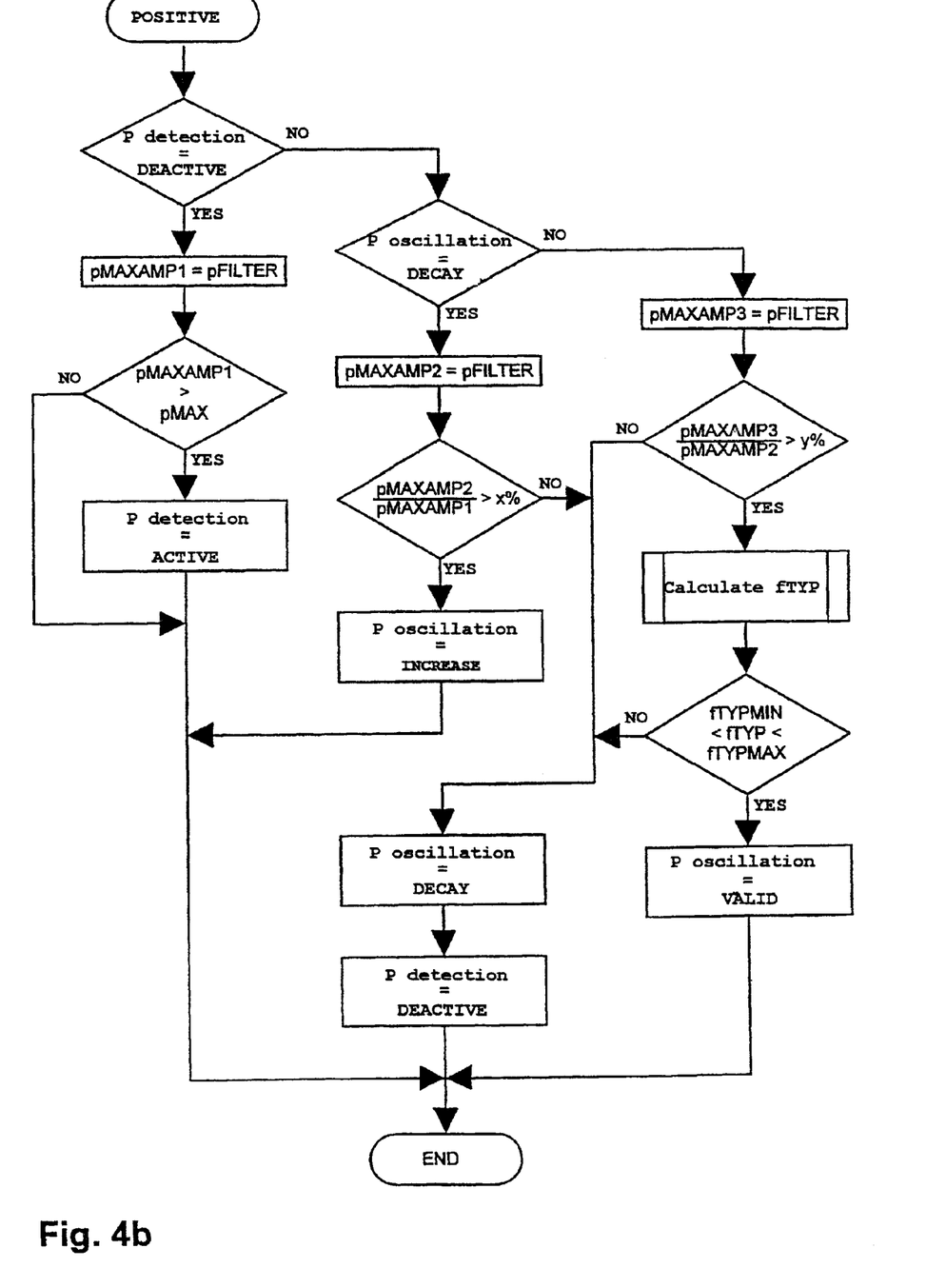
Figure 4C:
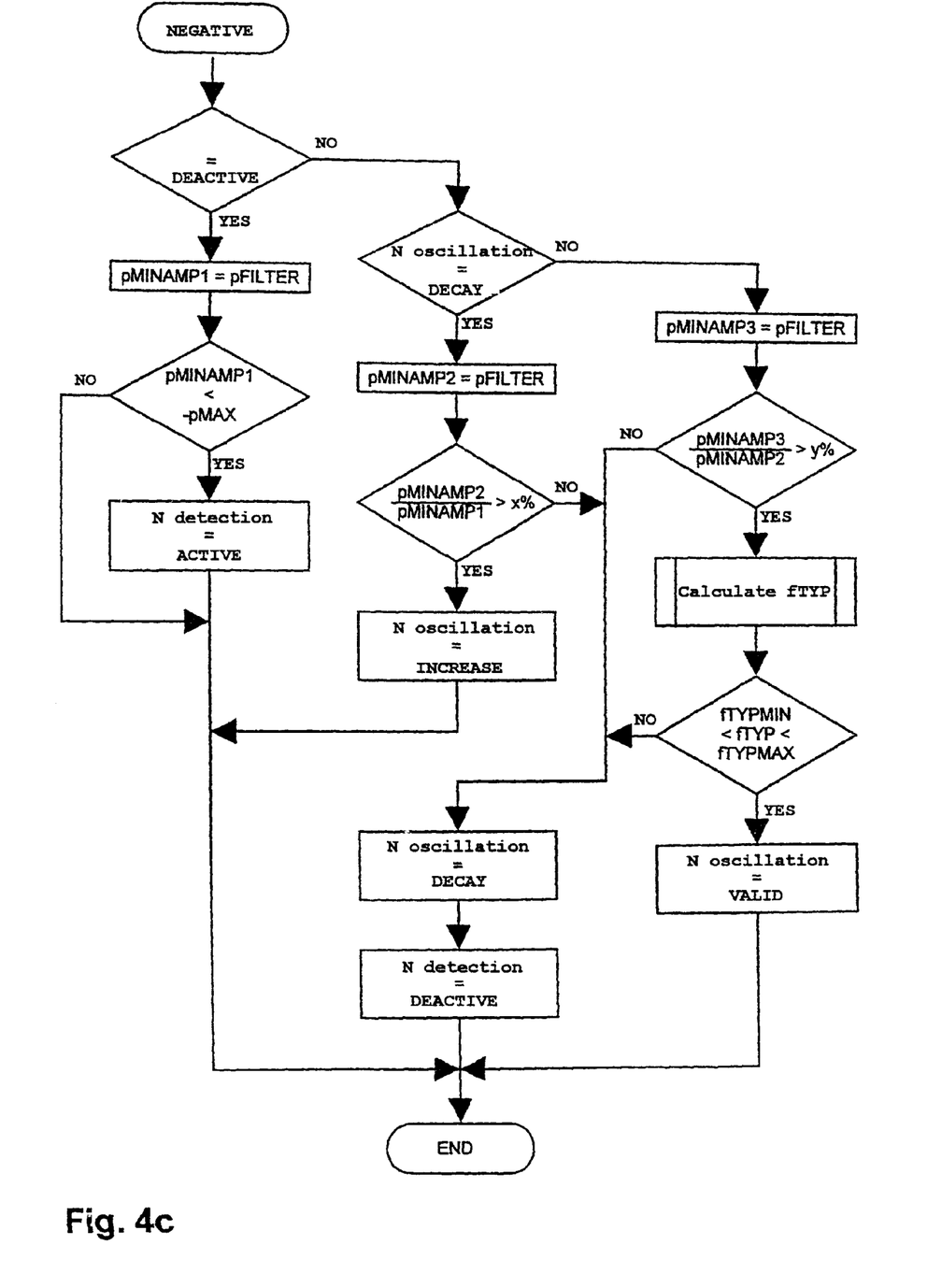

The sequence shown in FIGS. 4a to 4c is executed in a cyclic manner. In each cycle the current value of the signal $P_{FILTER}$ is sensed. If the value of $P_{FILTER}$ is in the order of (almost) zero, no adjustment of the working points $I_{ABBAU}$ and $I_{AUFBAU}$ is required so that no oscillation detection is carried out. Thereby, a re-initialisation of the statuses "P detection", "P oscillation", "N detection", as well as "N oscillation" is carried out in such a manner that "P detection" as well as "N detection" are set to deactive and "P oscillation" as well as "N oscillation" are set to decaying. The statuses "P detection" or "N detection", respectively, indicate whether an oscillation detection is deactive or active for the positive or negative, respectively, half-wave of the signal $P_{FILTER}$, while "P oscillation" or "N oscillation", respectively, indicate whether the positive or negative, respectively, half-wave of $P_{FILTER}$ is a decaying, increasing, and, possibly, valid oscillation.

If the value of $P_{FILTER}$ is outside the order of (almost) zero, a distinction is made as to whether the positive or negative half-wave of $P_{FILTER}$ is present. In the case of the positive half-wave, the sequence shown in FIG. 4b is followed, in the case of the negative half-wave the sequence shown in FIG. 4c is followed, with the sequences in FIGS. 4b and 4c being structurally identical.

As is shown in FIG. 4b, the first maximum amplitude $P_{MAXAMP1}$ of the positive half-wave is determined in a first step after the initial detection of a positive half-wave—the status "P detection" is still deactive at this time. Subsequently, the first maximum amplitude $P_{MAXAMP1}$ is compared with a predetermined threshold value $P_{MAX}$. If $P_{MAXAMP1}$ is lower than $P_{max}$, the oscillation detection is aborted. If, however, $P_{MAXAMP1}$ is higher than $P_{MAX}$ the status "P detection" is set to active in order to continue the oscillation detection.

Thereupon, the second maximum amplitude $P_{MAXAMP2}$ of the positive half-wave is determined in a second step—the status "P detection" is now active and the status "P oscillation" is still decaying. In order to determine whether the oscillation is increasing the ratio of the second maximum amplitude to the first maximum amplitude $P_{MAXAMP2}/P_{MAXAMP1}$ is formed and compared with a predetermined ratio $x_\%$. If the ratio $P_{MAXAMP2}/P_{MAXAMP1}$ is smaller than the predetermined ratio $x_\%$ the oscillation detection is aborted and the status "P detection" is again deactivated. If, however, the ratio $P_{MAXAMP2}/P_{MAXAMP1}$ is larger than the predetermined ratio $x_\%$ the status "P oscillation" is set to increasing and the oscillation detection is continued.

In the now following third step the third maximum amplitude $P_{MAXAMP3}$ of the positive half-wave is determined—the status "P detection" is active and the status "P oscillation" is increasing. In this case too, it is determined whether the oscillation is increasing, in that the ratio of the third maximum amplitude to the second maximum amplitude $P_{MAXAMP3}/P_{MAXAMP2}$ is formed and compared with a predetermined ratio $y_\%$. If the ratio $P_{MAXAMP3}/P_{MAXAMP2}$ is below the predetermined ratio $y_\%$ the oscillation detection is aborted here as well, with the status "P oscillation" being set to decaying and the status "P detection" being reset to deactive. On the other hand, if the oscillation is again increasing, a calculation of the typical oscillation frequency $f_{TYP}$ is now performed.

The calculation of the typical oscillation frequency $f_{TYP}$ can be performed in a simple manner via the time interval which occurs between the detection of the first, second, and/or third maximum amplitude $P_{MAXAMP1}$, $P_{MAXAMP2}$, $P_{MAXAMP3}$, and which is also sensed. Alternatively, the determination of the typical oscillation frequency $f_{TYP}$ can be performed, for example, by means of methods such as Whittaker's signal reconstruction or the fast Fourier transformation which, though being capable of obtaining a relatively high accuracy, require a high calculation expenditure, so that an implementation on a process computer of the electronic control unit ECU results in a very high system load.

After the calculation of the typical oscillation frequency, it is checked whether the value calculated for $f_{TYP}$ lies within a predetermined frequency range: $f_{TYPMIN} < f_{TYP} < f_{TYPMAX}$. If the value calculated for $f_{TYP}$ lies outside the frequency range which is predetermined by $f_{TYPMIN}$, $f_{TYPMAX}$ the oscillation detection is aborted, with the status "P oscillation" being set to decaying and the status "P detection" being reset to deactive. If the value calculated for $f_{TYP}$ lies within the frequency range which is predetermined by $f_{TYPMIN}$, $f_{TYPMAX}$ the oscillation detection for the positive half-wave is considered to be successfully completed, for which purpose the status "P oscillation" is set to valid.

The sequence of the oscillation detection for the negative half-wave of $P_{FILTER}$ shown in FIG. 4c is principally identical and therefore self-explanatory. In accordance with the statuses "P detection" and "P oscillation", the statuses "N detection" and "N oscillation" are set or scanned, respectively, and in accordance with the first to the third maximum amplitudes $P_{MAXAMP1}$, $P_{MAXAMP2}$, $P_{MAXAMP3}$ the first to the third minimum amplitudes $P_{MINAMP1}$, $P_{MINAMP2}$, $P_{MINAMP3}$ are determined. Accordingly, the status "N oscillation" is set to valid upon the successful completion of the oscillation detection.

In the embodiment for the oscillation detection which is explained with reference to FIGS. 4a to 4c, the first three maximum or minimum, respectively, amplitudes each are determined for the positive or negative, respectively, halfwave, which has proven under practical conditions. Generally the oscillation detection can be carried out with any number—but at least with two—maximum or minimum, respectively, amplitudes. When determining a higher number of maximum or minimum, respectively, amplitudes, a higher accuracy, in particular in the calculation of the typical oscillation frequency, can be obtained on the one hand, on the other hand, however, the time until the detection of a valid oscillation is prolonged.

In this context it is to be mentioned that the time from the activation of an oscillation detection to the detection of a valid oscillation is limited to a predetermined time period in any case. If this time period is exceeded which may occur, for example, during the determination of the maximum or minimum, respectively, amplitudes, the oscillation detection is aborted.

Figure 5A:
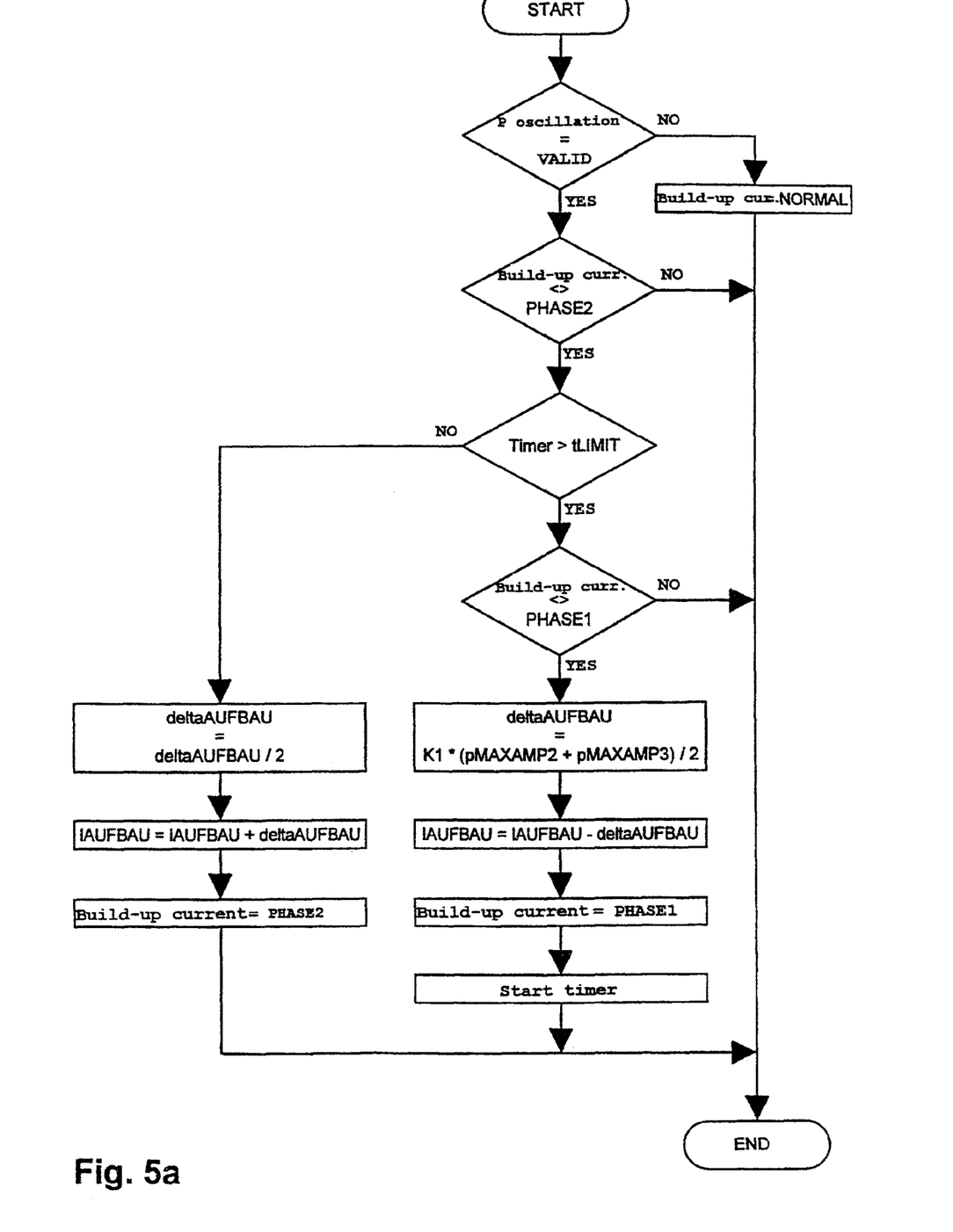
FIGS. 5a and 5b show a flow diagram for the adjustment of the working points of the control characteristic of an electronically controllable brake booster.
Figure 5B:
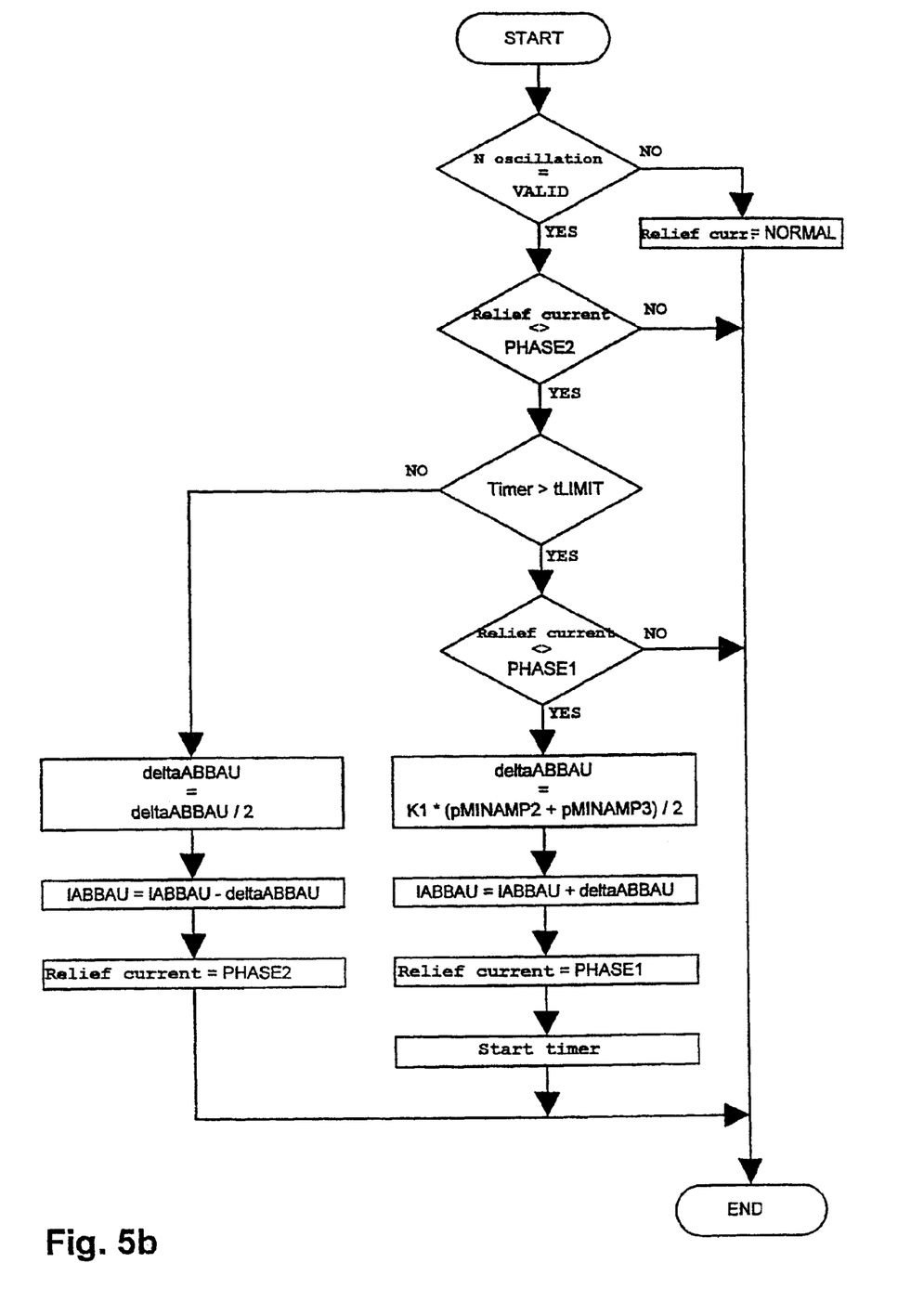

The adjustment of the working point $I_{AUFBAU}$ is shown in the flow diagram according to FIG. 5a, the adjustment of the working point $I_{ABBAU}$ is shown in the flow diagram according to FIG. 5b. The sequences of FIGS. 5a and 5b are structurally identical and are cyclically executed.

As is shown in FIG. 5a, an adjustment of the working point $I_{AUFBAU}$ is performed only if a valid oscillation has previously been detected. For this purpose, the status "P oscillation" is scanned for valid. If the status "P oscillation" is not valid, no adjustment of the working point $I_{AUFBAU}$ is performed, with the status "Build-up current" being reset to the initialisation value normal. This means that the working point $I_{AUFBAU}$ last adjusted is retained. With respect to a first adjustment of the working point $I_{AUFBAU}$, in particular, when switching on the ignition upon the commencement of a trip, reference is made again to the learning method according to DE 195 27 493 A1.

If the status "P oscillation" is valid—the status "Build-up current" is normal and the timer has not yet started—, a correction value $delta_{AUFBAU}$ is calculated which results from the arithmetic mean value of the two maximum amplitudes $P_{MAXAMP2}$, $P_{MAXAMP3}$ last determined multiplied by a weighting factor $K_1$. Then the working point $I_{AUFBAU}$ is reduced by the correction value $delta_{AUFBAU}$, and the status "Build-up current" is set to the first phase (PHASE1) and the timer is started. Due to the fact that the status "Build-up current" has been set to the first phase (PHASE1), the working point $I_{AUFBAU}$ is maintained unchanged as long as the timer has not reached the predetermined time limit $t_{LIMIT}$; in other words, the working point $I_{AUFBAU}$ is maintained constant for the time which is predetermined by $t_{LIMIT}$. When the timer has reached the predetermined time limit $t_{LIMIT}$ the previously calculated correction value $delta_{AUFBAU}$ is reduced to half, and the working point $I_{AUFBAU}$ is increased by this reduced correction value $delta_{AUFBAU}$. Thereby the status "Build-up current" is set to the second phase (PHASE2) so that subsequently no variation of the working point $I_{AUFBAU}$ is made, at least not until a new valid oscillation is detected which then initiates a new working point adjustment.

The sequence for the adjustment of the working point $I_{ABBAU}$ as shown in FIG. 5b is principally identical and therefore self-explanatory. Herein, the status "N oscillation" according to the status "P oscillation", and, according to the status "Build-up current" the status "Relieve current" are set or scanned, respectively. The correction value $delta_{ABBAU}$ is determined here as a function of the two minimum amplitudes $P_{MINAMP2}$, $P_{MINAMP3}$ last determined and weighted by a factor $K_2$. During the first phase (PHASE1) the working point $I_{ABBAU}$ is increased by the correction value $delta_{ABBAU}$ for the predetermined time $t_{LIMIT}$ and then reduced again by the reduced correction value $delta_{ABBAU}$ for the second phase (PHASE2).

The embodiment for the adjustment of the working points $I_{AUFBAU}$ and $I_{ABBAU}$, which is explained with reference to FIGS. 5a and 5b has also proven under practical conditions.

Accordingly, the working points $I_{AUFBAU}$ or $I_{ABBAU}$, respectively, are first increased or decreased, respectively, in order to increase or decrease, respectively, the working points $I_{AUFBAU}$ and $I_{ABBAU}$ again after a time period which is predetermined via $t_{LIMIT}$, after whose elapse it can be assumed that the system behaves more stable. The determination of the underlying correction value $delta_{AUFBAU}$ or $delta_{ABBAU}$, respectively, can also be performed via several maximum or minimum, respectively, amplitudes, provided this has previously been specified. Likewise, the later reduction of the correction values is not necessarily limited to a division by two, as described herein.

The oscillation detection as explained in FIGS. 4a to 4c and the correction of the working points as explained in FIGS. 5a and 5b are continuously cyclically executed, with the interface between the two method parts being determined via the statuses "P oscillation" or "N oscillation", respectively, as well as the supply of the maximum or minimum, respectively, amplitudes determined from the signal $P_{FILTER}$. It is also characterising for the inventive method that with an oscillation detected as valid in the range of the positive half-wave of the signal $P_{FILTER}$ a correction of only the working point $I_{AUFBAU}$ is performed, and with an oscillation detected as valid in the range of the negative half-wave of the signal $P_{FILTER}$ a correction of only the working point $I_{ABBAU}$ is performed. If an oscillation is detected as valid both in the range of the positive half-wave of the signal $P_{FILTER}$ and in the range of the negative half-wave of the signal $P_{FILTER}$, both working points $I_{AUFBAU}$ and $I_{ABBAU}$ are corrected.

The actual adjustment of the control current $I_{SOLL}$ to the working points $I_{AUFBAU}$ and $I_{ABBAU}$ which are set by means of the inventive method as well as a control algorithm employed therewith has been described in the already mentioned DE 195 27 493 A1.

The closed control loop shown in FIG. 6 is extended compared to FIG. 3, by a pilot controller S. The input side of the pilot controller S is supplied with the signal $P_{FILTER}$ filtered by the bandpass F. with a pilot controlled variable $I_{VOR}$ being provided at the output side as a negative feedback to the manipulated variable $I_{SOLL}$.

Alternatively, the standard deviation $X_D$ is supplied to the input side of the bandpass filter F in order to filter out the oscillation signal $P_{FILTER}$ which is typical for the brake booster. Due to the fact that the standard deviation $X_D$ is obtained by subtracting the controlled variable $P_{IST}$ from the reference variable $P_{SOLL}$ and that the reference variable $P_{SOLL}$ is a direct signal, the typical oscillation is also superimposed on the signal of the standard deviation $X_D$.

Figure 7:
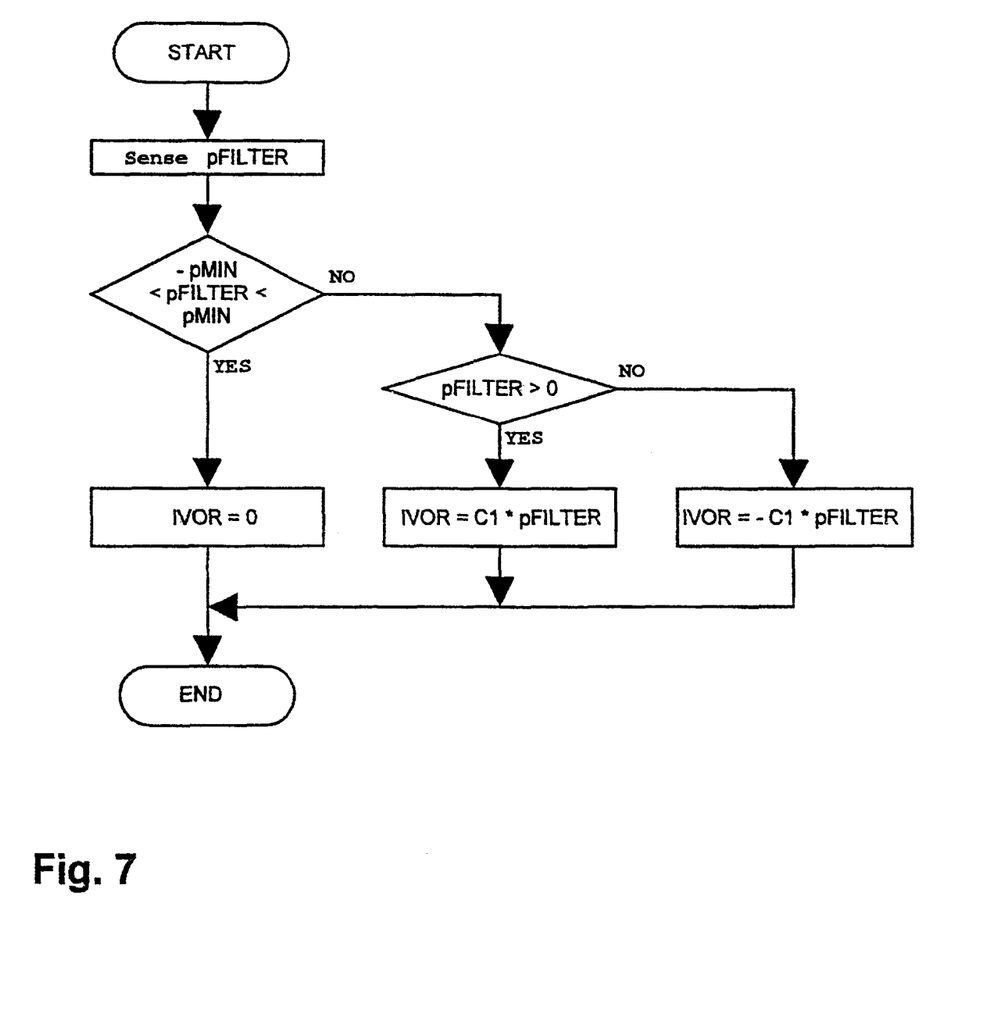
FIG. 7 shows a flow diagram for the determination of the pilot controlled variable of the embodiment of the control loop shown in FIG. 6.

From the flow diagram shown in FIG. 7, which is cyclically executed it can be seen how the pilot controlled variable $I_{VOR}$ is set as a function of the signal $P_{FILTER}$. Accordingly, the pilot controlled variable $I_{VOR}$ is obtained in that the positive components of the signal $P_{FILTER}$ are weighted by a positive factor $C_1$ and the negative components of the signal $P_{FILTER}$ are weighted by a negative factor $C_2$. Because, as shown in FIG. 6, the pilot controlled variable $I_{VOR}$ is subtracted from the manipulated variable $P_{SOLL}$ which is supplied to the controlled system (brake pressure generator 2 or solenoid arrangement 26, respectively) this means that in the case of positive components of the signal $P_{FILTER}$ the manipulated variable $I_{SOLL}$ is reduced and in the case of negative components of the signal $P_{FILTER}$ the manipulated variable $I_{SOLL}$ is increased.

By the application of the manipulated variable $I_{SOLL}$ with the pilot controlled variable $I_{VOR}$ an active correction of the manipulated variable $I_{SOLL}$ is effected early—already during the oscillation detection—, which leads to a further improvement of the control behaviour. For example, on the basis of the positive or negative, respectively, components of the signal $P_{FILTER}$, the tendency of too steep a rise (overshooting) or fall (undershooting), respectively, of the controlled variable $P_{IST}$ is detected early so that this can be counteracted in the explained way (damping). In addition, minor working point shifts are compensated by this measure, which are caused in particular by vacuum-induced pressure variations in the vacuum chamber 23 of the brake booster 21.

In order to be able to adjust the response behaviour of the pilot controller S it is possible—as can be seen from FIG. 7—to provide for a specification of the pilot controlled variable $I_{VOR}$ only if the signal $P_{FILTER}$ lies outside a response range: $-P_{MIN}<P_{FILTER}<P_{MIN}$ which is predetermined by a threshold value $P_{MIN}$. If the signal lies within this response range the pilot controlled variable $I_{VOR}$ is set to the value zero so that no influencing of the manipulated variable $I_{SOLL}$ takes place.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. An electronically controllable brake booster, with:

vacuum chamber and a pressure chamber which are separated from each other by a movable wall, a control valve arrangement being capable of adjusting a pressure difference between the pressure chamber and vacuum chamber, an electromagnetic actuation unit for actuating the control valve arrangement, and a control unit for controlling a current flowing through the electromagnetic actuation unit, wherein the control valve arrangement is capable to assume, as a function of the current flowing through the electromagnetic actuation unit means, a holding position in which the current ranges between a higher value and a lower value without the control valve arrangement leaving the holding position, a first pressure changing position in which the current is higher than the higher value and a second pressure changing position in which the current is lower than the lower value, characterised in that the control unit is adapted to
sense a value which is characteristic for an actual pressure characteristic in the pressure chamber,
checking the actual pressure characteristic for an existence of periodic oscillation components of a predetermined frequency band with a predetermined minimum amplitude, and
decrease the current for the first pressure changing position by a first predetermined value and to increase the current for the second pressure changing position by a second predetermined value upon the existence of the periodic oscillation components.

2. Electronically controllable brake booster according to claim 1 characterised in that the control unit is adapted to carry out the reduction of the current for the first pressure changing position and the increase of the current for the second pressure changing position for a predetermined time period.

3. The electronically controllable brake booster according to claim 1 characterised in that the control unit is adapted to check the actual pressure characteristic for the existence of the periodic oscillation components after a predetermined time interval following the decrease or increase, respectively, of the current for the first or second, respectively, pressure changing position, and increase both the first predetermined value for the decrease of the current for the first pressure changing position and the second predetermined value for the increase of the current for the second pressure changing position upon the existence of the periodic oscillation components.

4. The electronically controllable brake booster according to claim 1 characterised in that the control unit is adapted to carry out the check of the actual pressure characteristic for the existence of the periodic oscillation components by determining time intervals between characteristic places of the actual pressure characteristic.

5. The electronically controllable brake booster according to claim 4 characterised in that the control unit is adapted to determine the time intervals between one of the maxima, minima, zero crossings, and curve sections with comparable gradients of the actual pressure characteristic.

6. The electronically controllable brake booster according to claim 5 characterised in that the first pressure changing position is a pressure build-up position, and the second pressure changing position is a pressure relief position.

7. The electronically controllable brake booster according to claim 1 characterised in that the predetermined frequency band ranges from about 0 Hz to about 25 Hz.

8. The electronically controllable brake booster according to claim 1 characterised in that the predetermined frequency band ranges from about 5 Hz to about 10 Hz.

9. The electronically controllable brake booster according to claim 1 characterised in that the predetermined frequency band is about 7 Hz.

10. A control unit for controlling a current flowing through an electromagnetic actuation unit for actuating an electronically controllable brake booster wherein a control valve arrangement for adjusting a pressure difference between a pressure chamber and a vacuum chamber assumes, as a function of the current flowing through the electromagnetic actuation unit, a holding position in which the current ranges between a higher value and a lower value without the control valve arrangement leaving the holding position, a first pressure changing position in which the current is higher than the higher value and a second pressure changing position in which the current is lower than the lower value, the control unit being adapted to:

sense a value which is characteristic for an actual pressure characteristic in the pressure chamber, check the actual pressure chamber characteristic for an existence of periodic oscillation components of a predetermined frequency band with a predetermined minimum amplitude, and decrease the current for the first pressure changing position by a first predetermined value and increase the current for the second pressure changing position by a second predetermined value upon the existence of the periodic oscillation components of the predetermined frequency band with the predetermined minimum amplitude.

11. The control unit according to claim 10 characterised in that it is adapted to carry out the reduction of the current for the first pressure changing position and the increase of the current for the second pressure changing position for a predetermined time period.

12. The control unit according to claim 10 characterised in that the control unit is adapted to check the actual pressure characteristic for the existence of the periodic oscillation components after a predetermined time interval following the decrease or increase, respectively, of the current for the first or second, respectively, pressure changing position, and increase both the first predetermined value for the decrease of the current for the first pressure changing position and the second predetermined value for the increase of the current for the second pressure changing position upon the existence of the periodic oscillation components.

13. The control unit according to claim 10 characterised in that the control unit is adapted to carry out the check of the actual pressure characteristic for the existence of the periodic oscillation components by determining time intervals between characteristic places of the actual pressure characteristic.

14. The control unit according to claim 13 characterised in that the control unit is adapted to determine the time intervals between one of the maxima, minima, zero crossings, and curve sections with comparable gradients of the actual pressure characteristic.

15. The control unit according to claim 14 characterised in that the first pressure changing position is a pressure build-up position, and the second pressure changing position is a pressure relief position.

16. The control unit according to claim 10 characterised in that the predetermined frequency band ranges from about 0 Hz to about 25 Hz.

17. The control unit according to claim 10 characterised in that the predetermined frequency band ranges from about 5 Hz to about 10 Hz.

18. The control unit according to claim 10 characterised in that the predetermined frequency band is about 7 Hz.

19. A method for controlling an electronically control brake booster including a vacuum chamber and a pressure chamber which are separated from each other by a moveable wall, a control valve arrangement for adjusting a pressure difference between the pressure chamber and the vacuum chamber, an electromagnetic actuation unit for actuating the control valve arrangement and a control unit for controlling a current flowing through the electro magnetic actuation unit, the method comprising the steps of:

defining a higher value and a lower value for the current flowing through the electromagnetic actuation unit, defining a first pressure changing position current for a first pressure changing position in which the current is higher than the higher value, and defining a second pressure changing position current for a second pressure changing position in which the current is lower than the low value, characterised by sensing a value being characteristic for an actual pressure characteristic in the pressure chamber, checking the actual pressure characteristic for an existence of periodic oscillation components of a predetermined frequency band with a predetermined minimum amplitude, and increasing the first pressure changing position current by a first predetermined value and increasing the second pressure changing position current by a second predetermined value upon the existence of the periodic oscillation components of the predetermined frequency band with the predetermined minimum amplitude.

20. The method according to claim 19 characterised by carrying out the reducing of the first pressure changing position current and the increasing of the second pressure changing position current for a predetermined time period.

21. The method according to claim 19 characterised by checking the actual pressure characteristic for the existence of the periodic oscillation components after a predetermined time interval following the decreasing or increasing, respectively, of the first or second, respectively, pressure changing position current, and increasing both the first predetermined value and the second predetermined value upon the existence of the periodic oscillation components.

22. The method according to claim 19, characterised by checking the actual pressure characteristic by determining time intervals between characteristic places of the actual pressure characteristic.

23. The method according to claim 22 characterised by determining the time intervals between one of the maxima, minima, zero crossings and curve sections with comparable gradients of the actual pressure characteristic.

24. The method according to claim 19 characterised by defining the first pressure changing position current for a pressure built-up position, and defining the second pressure changing position current for a pressure release position.

25. The method according to claim 19 characterised by predetermining the predetermined frequency band to range from about 5 Hz to about 25 Hz.

26. The method according to claim 19 characterised by, predetermining the predetermined frequency band to range from about 5 Hz to about 10 Hz.

27. The method according to claim 19 characterised by predetermining the predetermined frequency band to be about 7 Hz.

* * * * *

UNITED STATES PATENT AND TRADEMARK OFFICE
CERTIFICATE OF CORRECTION

PATENT NO.    : 6,422,123 B1
DATED         : July 23, 2002
INVENTOR(S)   : Christoph Linden et al.

It is certified that error appears in the above-identified patent and that said Letters Patent is hereby corrected as shown below:

<u>Column 10,</u>
Line 14, after "unit" delete "means".

Signed and Sealed this

Nineteenth Day of November, 2002

*Attest:*

*Attesting Officer*

JAMES E. ROGAN
*Director of the United States Patent and Trademark Office*